United States Patent
Wu

(10) Patent No.: US 10,688,344 B2
(45) Date of Patent: Jun. 23, 2020

(54) TORQUE-MEASURING SYSTEM AND BODY TRAINING EQUIPMENT WITH THE SAME

(71) Applicant: Mu-Chuan Wu, Tainan (TW)

(72) Inventor: Mu-Chuan Wu, Tainan (TW)

(*) Notice: Subject to any disclaimer, the term of this patent is extended or adjusted under 35 U.S.C. 154(b) by 34 days.

(21) Appl. No.: 16/183,903

(22) Filed: Nov. 8, 2018

(65) Prior Publication Data

US 2020/0147450 A1 May 14, 2020

(51) Int. Cl.
| | |
|---|---|
| *A63B 24/00* | (2006.01) |
| *G01L 3/22* | (2006.01) |
| *A63B 21/22* | (2006.01) |
| *A63B 21/015* | (2006.01) |
| *A63B 21/00* | (2006.01) |
| *A63B 22/06* | (2006.01) |
| *A63B 71/06* | (2006.01) |

(52) U.S. Cl.
CPC .... *A63B 24/0062* (2013.01); *A63B 21/00069* (2013.01); *A63B 21/015* (2013.01); *A63B 21/225* (2013.01); *A63B 22/0605* (2013.01); *G01L 3/22* (2013.01); *A63B 71/0622* (2013.01); *A63B 2209/00* (2013.01); *A63B 2220/54* (2013.01); *A63B 2220/833* (2013.01)

(58) Field of Classification Search
CPC ............ A63B 24/0062; A63B 22/0605; A63B 21/225; A63B 21/015; A63B 21/00069; A63B 2220/54; A63B 71/0622; A63B 2209/00; A63B 2220/833; G01L 3/22
See application file for complete search history.

(56) References Cited

U.S. PATENT DOCUMENTS

| | | | | |
|---|---|---|---|---|
| 3,953,025 A | * | 4/1976 | Mazman | A63B 21/015 482/118 |
| 4,007,927 A | * | 2/1977 | Proctor | A63B 21/015 482/63 |
| 4,113,221 A | * | 9/1978 | Wehner | A47C 3/34 248/408 |

(Continued)

FOREIGN PATENT DOCUMENTS

| | | |
|---|---|---|
| CN | 1442680 A | 9/2003 |
| CN | 1985756 A | 6/2007 |

(Continued)

*Primary Examiner* — Garrett K Atkinson
(74) *Attorney, Agent, or Firm* — Rosenberg, Klein & Lee

(57) ABSTRACT

A torque-measuring system is applied to a training assembly of body training equipment. The training assembly includes a stationary base, a flywheel connected to the stationary base, a torque output mechanism driving the flywheel, and a brake member generating a resistance force by contacting the flywheel and displacing relative to the stationary base. The system has a measurement apparatus and a computation apparatus. The measurement apparatus includes a spring leaf and a strain measurement module. The spring leaf is connected between the brake member and the stationary base and has a mounting surface. The strain measurement module is mounted on the mounting surface of the spring leaf and generates a variation of electrical resistance corresponding to a strain of the spring leaf. According to the variation of electrical resistance, the computation apparatus outputs a torque value which reflects the magnitude of the torque outputted from the torque output mechanism.

15 Claims, 5 Drawing Sheets

(56) References Cited

U.S. PATENT DOCUMENTS

| | | | | |
|---|---|---|---|---|
| 4,206,914 A * | 6/1980 | Lee | A63B 21/0125 | 482/65 |
| 4,364,557 A * | 12/1982 | Serati | A63B 71/06 | 482/65 |
| 4,408,613 A * | 10/1983 | Relyea | A61B 5/222 | 482/5 |
| 4,417,724 A * | 11/1983 | Bikker | A63B 21/015 | 188/251 A |
| 4,595,198 A * | 6/1986 | Sparks | A63B 21/015 | 188/184 |
| 4,673,177 A * | 6/1987 | Szymski | A63B 21/015 | 482/119 |
| 5,007,675 A * | 4/1991 | Musto | B62J 1/08 | 297/215.14 |
| 5,031,901 A * | 7/1991 | Saarinen | A63B 21/0051 | 310/191 |
| 5,466,203 A * | 11/1995 | Chen | A63B 21/0051 | 482/63 |
| 5,916,067 A * | 6/1999 | Morasse | A63B 69/16 | 482/61 |
| 6,491,606 B1 * | 12/2002 | Swift | A63B 22/0605 | 482/57 |
| 6,659,486 B2 * | 12/2003 | Eschenbach | B62K 3/002 | 280/221 |
| 7,172,532 B2 * | 2/2007 | Baker | A63B 22/0605 | 403/109.1 |
| 7,314,434 B2 * | 1/2008 | Chen | A63B 21/0051 | 188/164 |
| 7,364,533 B2 * | 4/2008 | Baker | A63B 22/0605 | 248/408 |
| 7,470,220 B2 * | 12/2008 | Hernandez | A63B 21/012 | 188/25 |
| 7,803,095 B1 * | 9/2010 | LaGree | A63B 22/0089 | 482/121 |
| 8,052,581 B1 * | 11/2011 | Lohr | A63B 21/015 | 482/63 |
| 8,585,561 B2 * | 11/2013 | Watt | A63B 21/0051 | 482/57 |
| 8,641,585 B2 * | 2/2014 | LaGree | A63B 21/023 | 482/92 |
| 8,721,511 B2 * | 5/2014 | Endelman | A63B 21/156 | 482/121 |
| 8,834,324 B2 * | 9/2014 | Lull | A63B 21/015 | 482/63 |
| 9,310,264 B2 * | 4/2016 | David | G01L 1/2225 | |
| 9,327,162 B2 * | 5/2016 | Huang | A63B 22/06 | |
| 9,604,095 B1 * | 3/2017 | Lagree | A63B 23/03516 | |
| 2008/0234112 A1 * | 9/2008 | Hernandez | A63B 21/012 | 482/63 |
| 2010/0069205 A1 * | 3/2010 | Lee | A63B 21/0051 | 482/63 |
| 2010/0234185 A1 * | 9/2010 | Watt | A63B 21/0051 | 482/8 |
| 2010/0323850 A1 * | 12/2010 | Bingham, Jr. | A63B 21/225 | 482/63 |
| 2012/0088637 A1 * | 4/2012 | Lull | A63B 21/015 | 482/57 |
| 2012/0088638 A1 * | 4/2012 | Lull | A63B 21/015 | 482/57 |
| 2013/0333489 A1 * | 12/2013 | David | A61B 5/221 | 73/862.641 |
| 2017/0113091 A1 * | 4/2017 | Lagree | A63B 22/0087 | |
| 2017/0157452 A1 * | 6/2017 | Lagree | A63B 21/023 | |
| 2017/0157458 A1 * | 6/2017 | Lagree | A63B 22/0089 | |
| 2017/0189740 A1 * | 7/2017 | Lagree | A63B 21/15 | |
| 2017/0246499 A1 * | 8/2017 | Lagree | A63B 23/0233 | |

FOREIGN PATENT DOCUMENTS

| | | |
|---|---|---|
| CN | 107126681 A | 9/2017 |
| DE | 10249804 B4 | 8/2004 |
| EP | 2949367 A1 | 12/2015 |

\* cited by examiner

TORQUE-MEASURING SYSTEM AND BODY TRAINING EQUIPMENT WITH THE SAME

BACKGROUND OF THE INVENTION

1. Field of the Invention

The present invention relates to a torque-measuring system and body training equipment and, more particularly, to a torque-measuring system and body training equipment with the same.

2. Description of the Related Art

Conventional body training equipment allows users to adjust different levels of torque according to their physical conditions such that the training intensity upon the use of the body training equipment can be varied to adapt to the physical conditions of the users. The body training equipment may be an exercise bike having a frame, a pair of pedals mounted on the frame, a transmission assembly, a flywheel, and an adjustment rod. A brake member is mounted on one end of the adjustment rod and abrasive resistance can be generated by bringing the brake member in contact with a rim of the flywheel. Users can also vary the magnitude of the abrasive resistance exerted on the flywheel by turning a knob of the adjustment rod and pedaling the exercise bike to provide a torque driving the flywheel to rotate through the transmission assembly.

During workout with the body training equipment, the exercising effect is closely bound up with how much torque users provide, meaning that there is a necessity for users to determine the magnitude of the torque generated when using body training equipment.

SUMMARY OF THE INVENTION

An objective of the present invention is to provide a torque-measuring system and body training equipment including the torque-measuring system for the purpose of measuring the magnitude of the torque provided by a user when using the body training equipment and further assessing the workout effect of the user.

To achieve the foregoing objective, the torque-measuring system is applied to a training assembly, the training assembly includes a stationary base, a flywheel, a torque output mechanism, and a brake member, the flywheel is rotatably connected with the stationary base, the torque output mechanism drives the flywheel, the brake member abuts against the flywheel to generate an abrasive resistance force and is displaced relative to the stationary base, and the torque-measuring system includes a measurement apparatus and a computation apparatus.

The measurement apparatus includes a spring leaf and a strain measurement module.

The spring leaf has a first end, a second end, and a mounting surface.

The first end is connected with the brake member.

The second end is connected with the stationary base.

The strain measurement module is mounted on the mounting surface of the spring leaf and generates a variation of electrical resistance corresponding to a strain of the spring leaf.

The computation apparatus is connected to the measurement apparatus and outputs a torque value according to the variation of electrical resistance. The torque value reflects a magnitude of a torque outputted from the torque output mechanism.

To achieve the foregoing objective, the body training equipment includes a training assembly and a torque-measuring system.

The training assembly has a stationary base, a flywheel, a torque output mechanism, and a brake member.

The flywheel is connected with the stationary base.

The torque output mechanism is connected with the flywheel to drive the flywheel to rotate.

The brake member abuts against the flywheel to generate an abrasive resistance force and is displaced relative to the stationary base.

The torque-measuring system has a spring leaf and a strain measurement module.

The spring leaf has a first end, a second end, and a mounting surface.

The first end is connected with the brake member.

The second end is connected with the stationary base.

The strain measurement module is mounted on the mounting surface of the spring leaf and generates a variation of electrical resistance corresponding to a strain of the spring leaf.

The computation apparatus is connected to the measurement apparatus and outputs a torque value according to the variation of electrical resistance. The torque value reflects a magnitude of a torque outputted from the torque output mechanism.

According to the present invention, when a user applies a torque to drive the flywheel to rotate, because the brake member contacts a rim of the flywheel, the rotation of the flywheel drives the brake member to slightly displace the brake member along a rotation direction of the flywheel and the spring leaf is stretched by the displaced brake member to result in a strain of the spring leaf. The strain measurement module generates a variation of electrical resistance according to the strain of the spring leaf. The variation of electrical resistance is correlated with the magnitude of the torque provided by the user and is provided for the computation apparatus to output a torque value according to the variation of electrical resistance.

Other objectives, advantages and novel features of the invention will become more apparent from the following detailed description when taken in conjunction with the accompanying drawings.

DETAILED DESCRIPTION OF THE INVENTION

Figure 1:
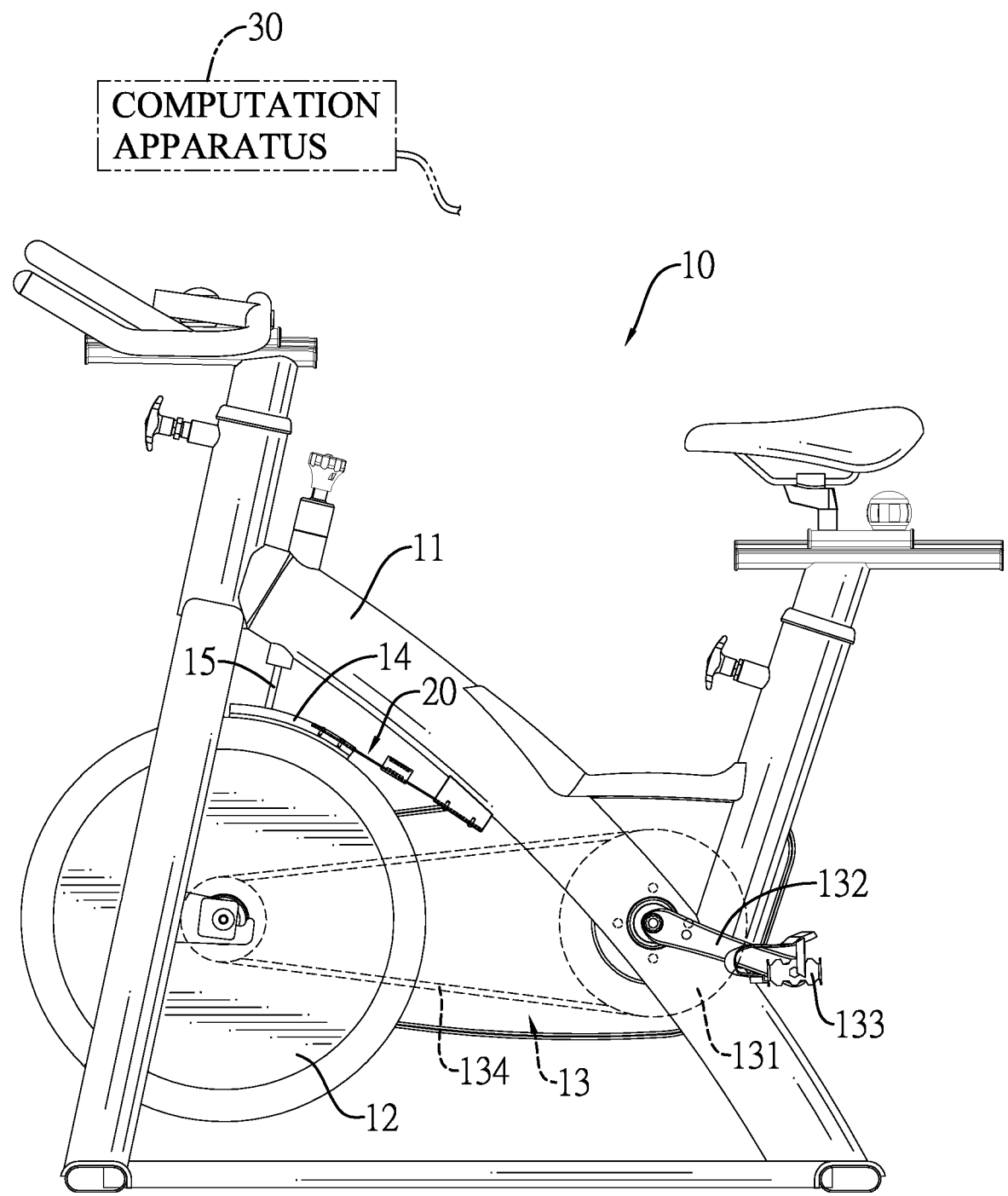
FIG. 1 is a schematic diagram showing a training assembly of body training equipment in accordance with the present invention.

With reference to FIG. 1, body training equipment in accordance with the present invention includes a training assembly 10 and a torque-measuring system. The torque-measuring system is applied to the training assembly.

An exercise bike is taken as an example of the training assembly 10 but not limitations thereto, including a stationary base 11, a flywheel 12, a torque output mechanism 13, a brake member 14 and an adjustment rod 15. The stationary base 11 may be a frame. The flywheel 12 is rotatably connected with the stationary base 11 to rotate relative to the stationary base 11. The torque output mechanism 13 is connected with the flywheel 12 to drive the flywheel 12 to rotate and includes a chain ring 131, two crank arms 132, two pedals 133, and a chain 134. The crank arms 132 are mounted on the chain ring 131. The pedals 133 are mounted on the respective crank arms 132. The chain 134 is connected between the chain ring 131 and the flywheel 12. The adjustment rod 15 is mounted on the stationary base 11 and is connected with the brake member 14 to control the brake member 14 to displace relative to the stationary base 11 for the brake member 14 to abut against a rim of the flywheel 12 in generation of an abrasive resistance force. The brake member 14 may be made of material such as wool felt, leather or rubber but not limited thereto.

With reference to FIG. 1, when a user steps on the pedals 133 to generate a torque, the torque is transmitted through the crank arms 132, the crank ring 131, and the chain 134 to drive the flywheel 12 for rotation. The user can adjust the adjustment rod 15 to move the brake member 14 in a direction near or away from the flywheel 12 so as to adjust the magnitude of the abrasive resistance force between the brake member 14 and the flywheel 12. By adjusting the abrasive resistance force, the rotation of the flywheel 12 can bring the brake member 14 to slightly displace along a direction in which the flywheel 12 rotates. Generally, the higher the torque applied by the user is, the faster the speed of the flywheel is and the greater the displacement of the brake member 14 is. Hence, the magnitude of the torque is correlated with the magnitude of the displacement of the brake member 14.

Figure 2:
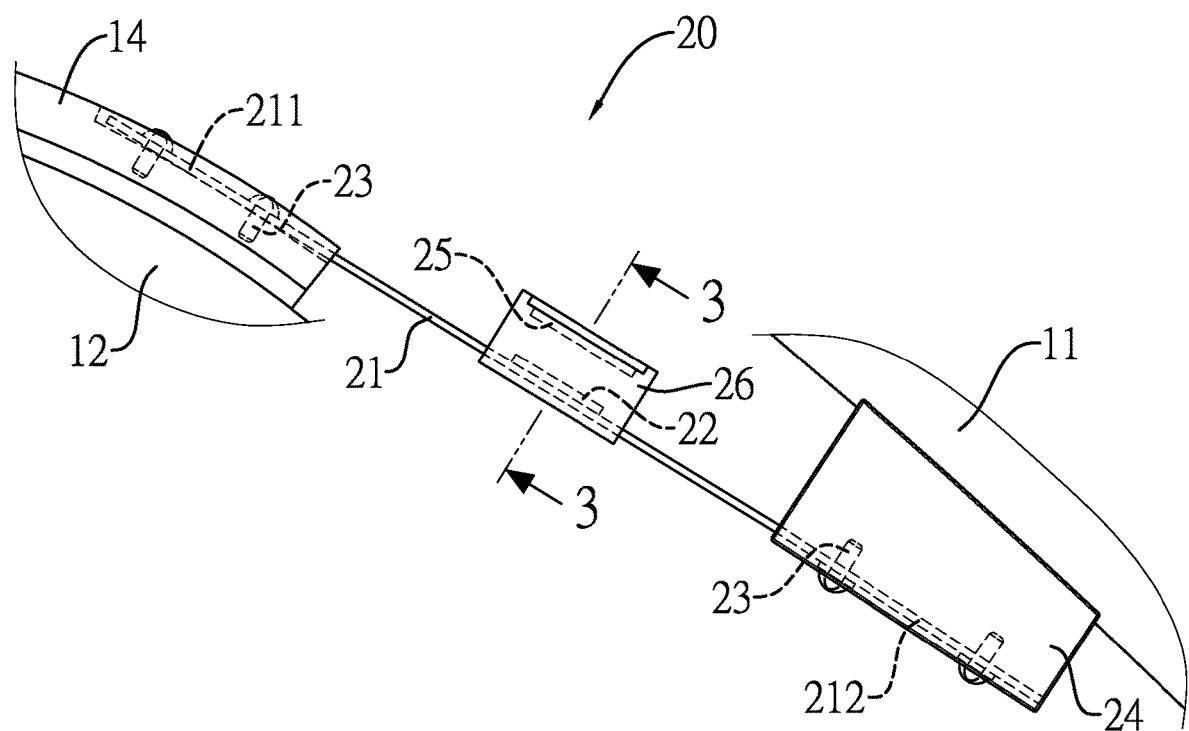
FIG. 2 is a schematic diagram showing a measuring device in connection with the training assembly in FIG. 1.
Figure 3:
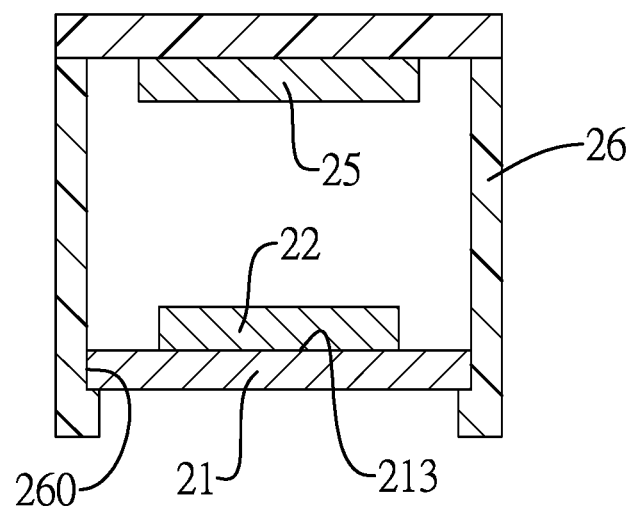
FIG. 3 is a cross-sectional view of the measuring device taken along a line A-A in FIG. 2.

With reference to FIGS. 1 and 2, the torque-measuring system includes a measurement apparatus 20 and a computation apparatus 30. The measurement apparatus 20 has a spring leaf 21 and a strain measurement module 22. The spring leaf 21 may take the form of being flat, planar, and elongated and may be made of a material, such as stainless steel, but is not limited to the foregoing form and material. With reference to FIGS. 2 and 3, the spring leaf 21 has a first end 211, a second end 212, and a mounting surface 213. The first end 211 is connected with the brake member 14. The second end 212 is connected with the stationary base 11. The mounting surface 213 is located between the first end 211 and the second end 212. In the present embodiment, the first end 211 of the spring leaf 21 is securely mounted on the brake member 14 by fasteners 23, such as screws. The stationary base 11 has a mounting block 24 mounted thereon. The second end 212 of the spring leaf 21 can be securely connected with the mounting block 24 by fasteners 23. The strain measurement module 22 may include one or more strain gauges. Each strain gauge takes the form of a plate and is attached to the mounting surface 213 of the spring leaf 21 or another surface of the spring leaf 21 opposite to the mounting surface 213. Each strain gauge generates a variation of electrical resistance corresponding to a strain measured by the strain gauge.

Figure 4:
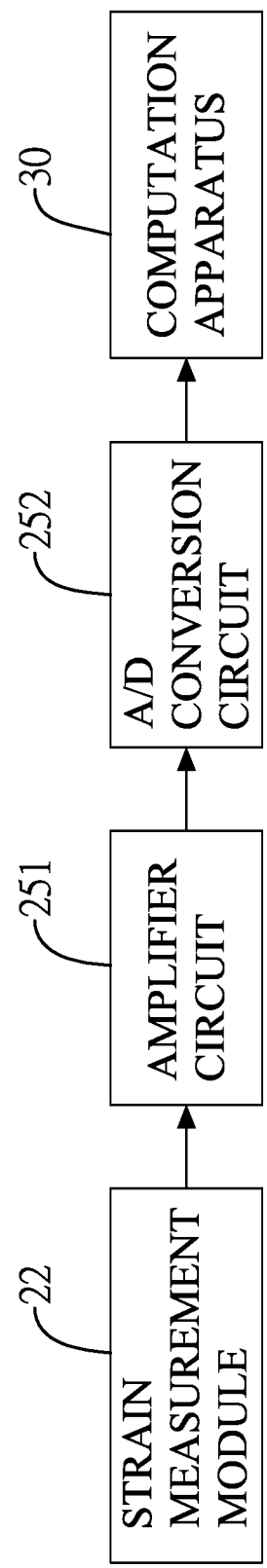
FIG. 4 is a functional block diagram showing a circuit of a torque-measuring system in accordance with the present invention.

The measurement apparatus 20 has a circuit board 25 and a casing 26. The casing 26 may be hollow and is mounted on the mounting surface 213 of the spring leaf 21 with the stain measurement module 22 mounted inside the casing 26. The casing 26 has two insertion slots 260 formed in two opposite internal walls of the casing 26 for two opposite edges of the spring leaf 21 to be mounted in the respective insertion slots 260, such that the casing 26 can be fixedly coupled to the spring leaf 21. The circuit board 25 is mounted inside the casing 26 and is opposite to the strain measurement module 22 with a gap formed therebetween. With reference to FIG. 4, the circuit board 25 includes an amplifier circuit 251 and an analog to digital (A/D) conversion circuit 252. The amplifier circuit 251 may be connected to the strain measurement module 22 through conductors, such as conducting wires. The strain measurement module 22 may be collaborated with resistors on the circuit board 25 to form a bridge circuit, which may be a Wheatstone bridge. The bridge circuit generates an output voltage according to the variation of electrical resistance value of each strain gauge. The amplifier circuit 251 amplifies the output voltage. The A/D conversion circuit 252 is electrically connected to the amplifier circuit 251 to convert the output voltage in the form of an analog signal into a measurement value in a digital form to reflect a strain of the spring leaf 21.

The computation apparatus 30 may be a computer or a monitoring meter and is connected to the measurement apparatus 20 by way of a wired or wireless means. The computation apparatus 30 outputs a torque value according to a variation of electrical resistance of the strain measurement module 22. In the present embodiment, as the measurement value is correlated with the variation of electrical resistance of the strain measurement module 22, the torque value is outputted according to the measurement value. The torque value reflects the magnitude of the torque outputted from the torque output mechanism 13 or the magnitude of the torque exerted by the user. An embodiment for explaining how the computation apparatus 30 outputs the torque value according to the measurement value is described as follows.

Figure 5:
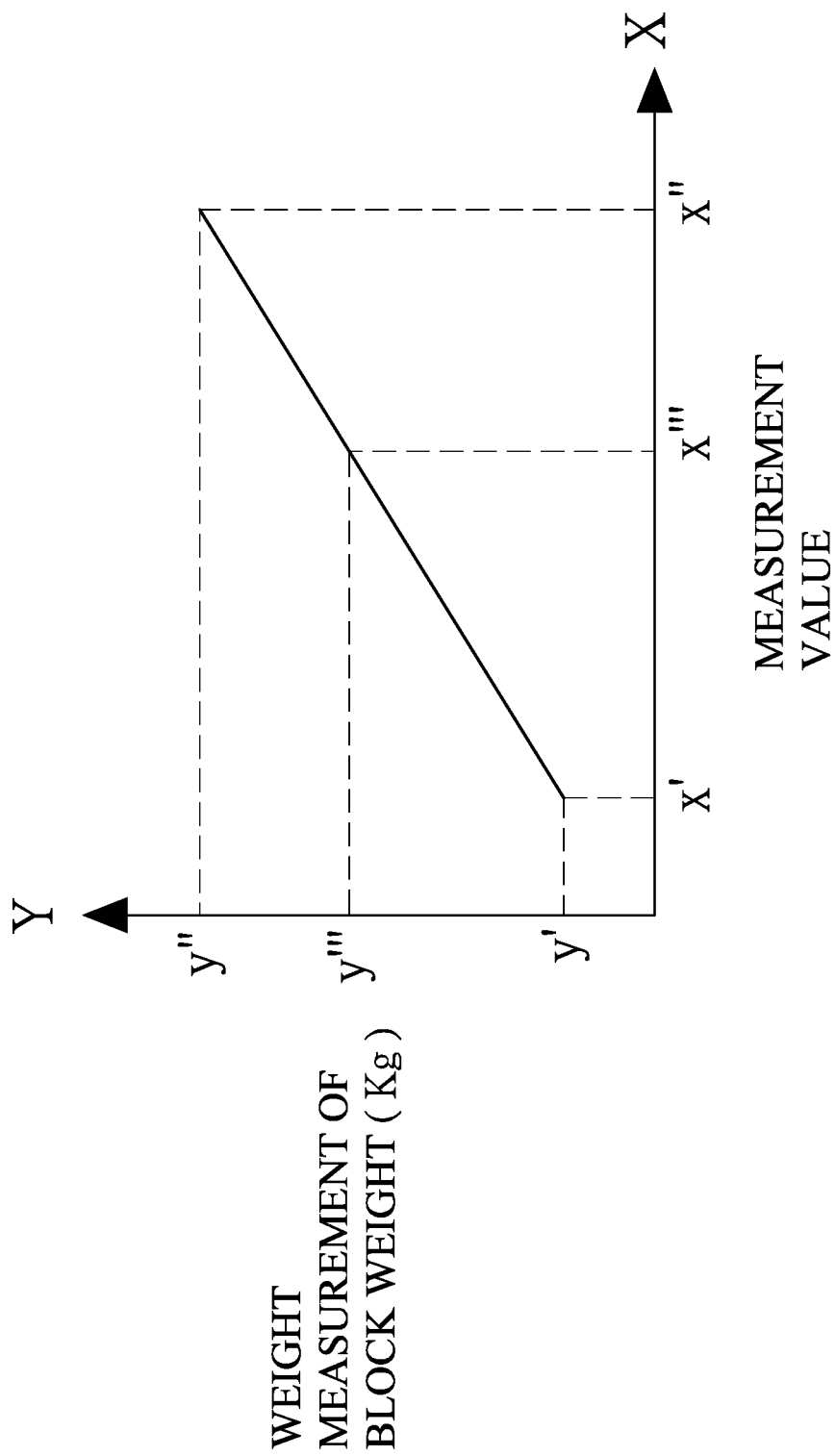
FIG. 5 is a chart showing relationship between measured torque values and applied weight when a torque-measuring system in FIG. 4 is tested.

Prior to shipment of the body training equipment, the manufacturer of the body training equipment should perform a calibration check on the measurement apparatus 20. Upon the calibration check, the measurement apparatus 20 is positioned in an upright manner with the first end 211 of the spring leaf 21 fixed and the second end 212 sequentially suspended with two block weights with different weight measurements. With reference to FIG. 5, when one of the two block weights suspended for the first time is y', the measurement value generated by the measurement apparatus 20 is x', and when the other block weight subsequently suspended is y'', the measurement value generated by the measurement apparatus 20 is x''. Based on the pairs of values x', y' and x'', y'', a linear equation Y=aX+b, where a and b are constant, can be obtained. The manufacturer can store the linear equation and the radius of the flywheel 12 in the computation apparatus 30.

In sum, as the computation apparatus 30 is built in with the linear equation and the radius of the flywheel 12 after shipment of the body training equipment, when the body training equipment is used for exercising, the rotation of the flywheel 12 results in displacement of the brake member 14, which in turn gets the spring leaf 21 stretched to generate a measurement value x'''. The computation apparatus 30 substitutes the measurement value x''' into the variable X in the linear equation to obtain a weight measurement y'''. Then, the computation apparatus 30 can calculate a torque value (T), which is a product of the weight measurement y''' and the radius of the flywheel 12 and is in unit of Newton-meter (N-m), to reflect the magnitude of the torque outputted by the user. Moreover, the computation apparatus 30 can calculate consumed energy (in Watt) of the user according to the torque value. The consumed energy can be expressed in the following.

$$Watt = \frac{T \times 2\pi \times r.p.m.}{60}$$

where T is the torque value and r.p.m is the rotation speed of the flywheel 12. As being known to people ordinarily skilled in the art, the means for detecting the rotation speed of the flywheel 12 is not elaborated here. Given as an example, the computation apparatus 30 is electrically connected to a rotation speed meter that detects the rotation speed of the flywheel with the rotation speed meter and receives the rotation speed detected by the rotation speed meter.

Additionally, the computation apparatus 30 can show the foregoing product and the consumed energy on a display for viewing purpose to users.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A torque-measuring system applied to a training assembly, wherein the training assembly includes a stationary base, a flywheel rotatably connected with the stationary base, a torque output mechanism driving the flywheel, and a brake member abutting against the flywheel to generate an abrasive resistance force and displaced relative to the stationary base, the torque-measuring system comprising:
    a measurement apparatus including:
        a spring leaf having:
            a first end connected with the brake member;
            a second end connected with the stationary base; and
            a mounting surface; and
        a strain measurement module mounted on the mounting surface of the spring leaf and generating a variation of electrical resistance corresponding to a strain of the spring leaf; and
    a computation apparatus connected to the measurement apparatus and outputting a torque value according to the variation of electrical resistance, wherein the torque value reflects a magnitude of a torque outputted from the torque output mechanism.

2. The torque-measuring system as claimed in claim 1, wherein the measurement apparatus includes:
    a casing mounted on the spring leaf with the strain measurement module mounted inside the casing; and
    a circuit board mounted inside the casing, being opposite to the strain measurement module, and including
        an amplifier circuit electrically connected to a bridge circuit formed by the strain measurement module and amplifying an output voltage generated by the bridge circuit according to the variation of electrical resistance; and
        an analog to digital (A/D) conversion circuit electrically connected to the amplifier circuit and converting the output voltage into a measurement value in a digital form;
    wherein the computation apparatus is connected to the circuit board to receive the measurement value and outputs the torque value according to the measurement value.

3. The torque-measuring system as claimed in claim 2, wherein the casing has two insertion slots formed in two opposite internal walls of the casing for two opposite edges of the spring leaf to be mounted in the respective insertion slots, such that the casing is fixedly coupled to the spring leaf.

4. The torque-measuring system as claimed in claim 2, wherein the computation apparatus substitutes the measurement value into an equation for computation to obtain a weight measurement, and the torque value is equal to a product of the weight measurement and a radius of the flywheel.

5. The torque-measuring system as claimed in claim 3, wherein the computation apparatus substitutes the measurement value into an equation for computation to obtain a weight measurement, and the torque value is equal to a product of the weight measurement and a radius of the flywheel.

6. The torque-measuring system as claimed in claim 4, wherein the equation is a linear equation.

7. The torque-measuring system as claimed in claim 5, wherein the equation is a linear equation.

8. The torque-measuring system as claimed in claim 6, wherein the spring leaf is flat, planar and elongated and is made of stainless steel.

9. The torque-measuring system as claimed in claim 7, wherein the spring leaf is flat, planar and elongated and is made of stainless steel.

10. Body training equipment comprising:
    a training assembly having:
        a stationary base;
        a flywheel connected with the stationary base;
        a torque output mechanism connected with the flywheel to drive the flywheel to rotate; and
        a brake member abutting against the flywheel to generate an abrasive resistance force and displaced relative to the stationary base; and
    a torque-measuring system having:
        a spring leaf having:
            a first end connected with the brake member;
            a second end connected with the stationary base; and
            a mounting surface; and
        a strain measurement module mounted on the mounting surface of the spring leaf and generating a variation of electrical resistance corresponding to a strain of the spring leaf; and
        a computation apparatus connected to the measurement apparatus and outputting a torque value according to the variation of electrical resistance, wherein the torque value reflects a magnitude of a torque outputted from the torque output mechanism.

11. The body training equipment as claimed in claim 10, wherein the measurement apparatus includes:
    a casing mounted on the spring leaf with the strain measurement module mounted inside the casing; and
    a circuit board mounted inside the casing, being opposite to the strain measurement module, and including
        an amplifier circuit electrically connected to a bridge circuit formed by the strain measurement module and amplifying an output voltage generated by the bridge circuit according to the variation of electrical resistance; and an analog to digital (A/D) conversion circuit electrically connected to the amplifier circuit and converting the output voltage into a measurement value in a digital form;

wherein the computation apparatus is connected to the circuit board to receive the measurement value and outputs the torque value according to the measurement value.

12. The body training equipment as claimed in claim 11, wherein the computation apparatus substitutes the measurement value into an equation for computation to obtain a weight measurement, and the torque value is equal to a product of the weight measurement and a radius of the flywheel.

13. The body training equipment as claimed in claim 10, wherein
the stationary base is a frame of an exercise bike;
the flywheel is rotatably connected with the stationary base to rotate relative to the stationary base;
the torque output mechanism has:
a chain ring;
two crank arms mounted on the chain ring;
two pedals mounted on the respective crank arms; and
a chain connected between the chain ring and the flywheel; and
the brake member is connected with an adjustment rod mounted on the stationary base.

14. The body training equipment as claimed in claim 11, wherein
the stationary base is a frame of an exercise bike;
the flywheel is rotatably connected with the stationary base to rotate relative to the stationary base;
the torque output mechanism has:
a chain ring;
two crank arms mounted on the chain ring;
two pedals mounted on the respective crank arms; and
a chain connected between the chain ring and the flywheel; and
the brake member is connected with an adjustment rod mounted on the stationary base.

15. The body training equipment as claimed in claim 12, wherein
the stationary base is a frame of an exercise bike;
the flywheel is rotatably connected with the stationary base to rotate relative to the stationary base;
the torque output mechanism has:
a chain ring;
two crank arms mounted on the chain ring;
two pedals mounted on the respective crank arms; and
a chain connected between the chain ring and the flywheel; and
the brake member is connected with an adjustment rod mounted on the stationary base.

* * * * *